United States Patent [19]
Breitbart et al.

[11] Patent Number: 5,864,851
[45] Date of Patent: Jan. 26, 1999

[54] METHOD AND SYSTEM FOR MANAGING REPLICATED DATA WITH ENHANCED CONSISTENCY AND CONCURRENCY

[75] Inventors: Yuri Breitbart, Lancaster, Ky.; Henry F. Korth, Lower Gwynedd, Pa.

[73] Assignee: Lucent Technologies Inc., Murray Hill, N.J.

[21] Appl. No.: 843,196

[22] Filed: Apr. 14, 1997

[51] Int. Cl.[6] .................................................. G06F 17/30
[52] U.S. Cl. ........................... 707/8; 707/102; 707/203
[58] Field of Search ................................ 707/8, 102, 203

[56] References Cited

U.S. PATENT DOCUMENTS

| | | | |
|---|---|---|---|
| 4,769,772 | 9/1988 | Dwyer | 707/2 |
| 5,222,217 | 6/1993 | Blount et al. | 707/204 |
| 5,241,675 | 8/1993 | Sheth et al. | 707/8 |
| 5,280,619 | 1/1994 | Wang | 395/726 |
| 5,504,899 | 4/1996 | Raz | 707/10 |
| 5,530,851 | 6/1996 | Fortier | 707/2 |

OTHER PUBLICATIONS

A.A Helal, A.A. Heddaya and B.B. Bhargava, "Replication Techniques in Distributed Systems," Kluwer Academic Publishers, 1996.

C. Pu and A. Leff, "Replica Control in Distributed Systems: an Asynchronous Approach," Proceedings of ACM–SIGMOD 1991 International Conference on Management of Data, Denver, Colorado, pp.377–386, May 1991.

J. Sidell, P.M. Aoki, S. Barr, A. Sah, C. Staelin, M. Stonebraker and A. Yu, "Data Replication in Mariposa," Proceedings of the Twelfth International Conference on Data Engineering, New Orleans, Louisiana, 1996.

E. Holler, "Multiple Copy Update," Lecture Notes in Computer Science, Distributed Systems–Architecture and Implementation: An Advanced Course, Springer–Verlag, Berlin, 1981.

H.F. Korth, E. Levy and A. Silberschatz, "A Formal Approach to Recovery by Compensating Transactions," Proceedings of the Sixteenth International Conference on Very Large Databases, Brisbane, Australia, pp. 95–106, Aug., 1990.

J. Gray, P. Helland, P. O'Neil and D. Shasha, "The Dangers of Replication and a Solution," Proceedings of ACM–SIGMOD 1996 International Conference on Management of Data, Montreal, Quebec, pp. 173–182, 1996.

(List continued on next page.)

*Primary Examiner*—Wayne Amsbury

[57] ABSTRACT

Method and system for managing transactions operating on replicated data items at multiple physical sites in a distributed database system. The transactions include local transactions each being processed at one of the physical sites and global transactions each being processed at multiple physical sites. Each transaction originates at one of the physical sites, and is permitted to read data items only at that physical site. In addition, only transactions originating at a physical site at which a primary copy of a data item is located are permitted to update that data item. A number of virtual sites are defined such that a given virtual site $VS_i^j$ at a particular point in time includes a set $S_i^j$ of all data items at a physical site $s_j$ that a given transaction $T_i$ has accessed from an initial operation up to that point in time. A replication graph is maintained to represent the relationships between the transactions and the virtual sites. The replication graph includes a first set of nodes for the transactions, and a second set of nodes for the virtual sites. A node for a transaction $T_i$ and a node for a virtual site $VS_i^j$ are connected in the graph if a schedule of transaction operations includes a write operation by transaction $T_i$ on a replicated data item in the set of data items associated with virtual site $VS_i^j$. The replication graph is maintained as part of a concurrency-control protocol and the absence of cycles in the graph may be used to indicate whether a given schedule is globally serializable.

27 Claims, 7 Drawing Sheets

OTHER PUBLICATIONS

P. Chundi, D.J. Rosenkrantz and S.S. Ravi, "Deferred Updates and Data Placement in Distributed Databases," Proceedings of the Twelfth International Conference on Data Engineering, New Orleans, Louisiana, 1996.

H.F. Korth and T.I. Imielinski, "Introduction to Mobile Computing," in Mobile Computing, pp. 1–39, Kluwer Academic Publishers, 1996.

Y. Breitbart, H. Garcia–Molina and A. Silberschatz, "Overview of Multidatabase Transaction Management," VLDB Journal, 1(2), 1992.

C.A. Ellis, "Consistency and Correctness of Duplicate Database Systems," Operating Systems Review, 11(5), Nov. 1977.

R.H. Thomas, "A Solution to the Concurrency Control Problem for Multiple Copy Databases," CompCon78, 1978.

T. Minoura, "A New Concurrency Control Algorithm for Distributed Database Systems," Proceedings of the Fourth Berkeley Workshop on Distributed Databases and Computer Networks, pp. 221–234, Aug. 1979.

H.F. Korth et al., "A Framework for Understanding Distributed (Deadlock Detection) Algorithms," ACM 0–89791–097, pp. 192–201, 1983.

J. Gray, P. Homan, R. Obermarck and H. Korth, "A Strawman Analysis of Probability of Waiting and Deadlock," IBM Research Report, IBM Research Laboratory, San Jose, CA, Feb. 1981.

K.M. Chandy and J. Misra, "Distributed Deadlock Detection," ACM Transactions on Computer Systems, vol. 1, No. 2, pp. 144–156, May 1983.

E. Gelenbe and K. Sevcik, "Analysis of Update Synchronization for Multiple Copy Databases," Proceedings of the Third Berkeley Workshop on Distributed Databases and Computer Networks, pp. 69–90, Aug. 1978.

METHOD AND SYSTEM FOR MANAGING REPLICATED DATA WITH ENHANCED CONSISTENCY AND CONCURRENCY

FIELD OF THE INVENTION

The present invention relates generally to database management techniques, and more particularly to techniques for managing access and updates to replicated data items at multiple sites in a distributed database system.

BACKGROUND OF THE INVENTION

Many database systems support data processing transactions at multiple user sites. For example, a transaction operating at a particular user site may access a primary copy of a data item or record of a central database, while transactions at other user sites utilize replicated versions of the data item. A significant problem arises when the transactions at the different user sites attempt to update different replicated versions of the same data item, which may result in inconsistent replicated versions of a given data item. The problem of concurrent access to consistent replicated data has become increasingly challenging with the advent of large-scale distributed data warehouses and data marts, and the increasing use of distributed data in often-disconnected mobile computers. For example, data warehouses or data marts are now typically configured with storage capacities on the order of 0.5 to 3 terabytes, with approximately 10% to 25% of the stored data items being used in a replicated form, and about 10% of the data items being updated each day. These systems may require that all data item updates be reflected within a relatively short time period, such as 10 minutes or less. Other features of distributed database systems are described in, for example, A. A. Helal, A. A. Heddaya and B. B. Bhargava, "Replication Techniques in Distributed Systems," Kluwer Academic Publishers, 1996; C. Pu and A. Leff, "Replica Control in Distributed Systems: an Asynchronous Approach," Proceedings of ACM-SIGMOD 1991 International Conference on Management of Data, Denver, Colo., pp.377–386, May 1991; and J. Sidell, P. M. Aoki, S. Barr, A. Sah, C. Staelin, M. Stonebraker and A. Yu, "Data Replication in Mariposa," Proceedings of the Twelfth International Conference on Data Engineering, New Orleans, La., 1996, all of which are incorporated by reference herein.

In order to ensure that multiple concurrent transactions have access to consistent replicated data, it is important to determine whether a proposed schedule of transaction operations is globally serializable. A schedule of transaction operations is "serializable" if running the transactions concurrently in accordance with the schedule yields the same results as running the transactions in some sequential order. Global serializability refers to serializability as applied to execution of all transactions in a system regardless of the physical sites at which particular transactions operate. The serializability of a given schedule of transaction operations depends in large part on the techniques used to update replicated data items. A number of so-called "eager" update propagation techniques are described in E. Holler, "Multiple Copy Update," Lecture Notes in Computer Science, Distributed Systems-Architecture and Implementation: An Advanced Course, Springer-Verlag, Berlin, 1981, which is incorporated by reference herein. However, these techniques are often unsuitable for use with large-scale distributed systems. In a typical eager propagation technique, the number of deadlocks, in which two or more transactions simultaneously attempt to update a replica or primary copy of the same data item, increases as the cube of the number of user sites and as the fourth power of transaction size. This is particularly problematic with relatively long data-mining queries, which typically access many different data items, and with mobile transactions which effectively live for a long period of time if the portable computer or other mobile computing device is disconnected. Deadlocks are thus no longer rare events with a negligible impact on performance, but instead present a substantial barrier to the efficient operation of large-scale distributed database systems.

Other known update techniques, generally referred to as "lazy" propagation techniques, address the above-described update propagation problem. Under lazy propagation, only one replica of a particular data item is updated by a transaction utilizing that data item. A separate transaction runs on behalf of the original transaction at each site at which update propagation is required. Lazy propagation effectively reduces transaction size but creates the possibility of two or more transactions committing conflicting updates to a data item if the transactions operate on different replicas. For example, a transaction $T_1$ could update a data item d using the replica at a site $s_1$ while a transaction $T_2$ updates the replica of d at another site $s_2$. If both transactions $T_1$ and $T_2$ commit an update of their replicas of the data item, the distributed system discovers the conflict only when the updates are propagated. Such conflicts may require either update reconciliation or the use of compensating transactions, as described in H. F. Korth, E. Levy and A. Silberschatz, "A Formal Approach to Recovery by Compensating Transactions," Proceedings of the Sixteenth International Conference on Very Large Databases, Brisbane, Australia, pp. 95–106, August, 1990, which is incorporated by reference herein. Consistency can be ensured despite lazy propagation by directing all updates to a primary copy of the data item, and employing an appropriate concurrency-control protocol. The process of directing all updates to a primary copy of the data item is referred to as the lazy-master approach to update regulation in J. Gray, P. Helland, P. O'Neil and D. Shasha, "The Dangers of Replication and a Solution," Proceedings of ACM-SIGMOD 1996 International Conference on Management of Data, Montreal, Quebec, pp. 173–182, 1996, which is incorporated by reference herein. Unfortunately, previous techniques for managing transaction updates in accordance with the lazy-master approach either fail to guarantee consistency, or are subject to a prohibitive number of deadlocks, or both.

Conventional lazy propagation techniques may also cause an update transaction to read "old" replicas of some data items, resulting in an execution that generates an inconsistent database state. As an example, consider a bank database for checking and savings accounts that is distributed over two sites $s_1$ and $s_2$. Site $s_1$ contains the primary copy of the checking-account relation and a replica of the savings-account relation, while site $s_2$ contains the primary copy of the savings-account relation and a replica of the checking-account relation. The bank requires only that the sum of a customer's checking and savings accounts be positive. Suppose that a husband and wife have joint checking and savings accounts and the balances in these two accounts are $300 and $700, respectively. The husband withdraws $900 from the checking account using an ATM at $s_1$ and, at approximately the same time, the wife withdraws $900 from the savings account using an ATM at $s_2$. Due to the delay in update propagation resulting from use of a lazy propagation approach, both transactions may succeed. However, after the updates are propagated, both accounts have a negative balance, violating the bank's constraint that the sum of the balances must be positive. Conventional lazy propagation techniques generally have difficulty avoiding this type of inconsistency. The problem may be alleviated to some extent by augmenting the lazy-master approach with restrictions on how the primary copies of data items are selected, as described in P. Chundi, D. J. Rosenkrantz and S. S. Ravi, "Deferred Updates and Data Placement in Distributed Databases," Proceedings of the Twelfth International Conference on Data Engineering, New Orleans, La., 1996, which is incorporated by reference herein. However, the resulting update propagation remains unduly susceptible to deadlocks and therefore is unsuitable for use in applications such as large-scale distributed systems with mobile computers.

It is therefore apparent that a need exists for an improved technique for providing update propagation and other concurrency-control operations in a distributed database system in which replicated data items are processed at multiple sites, such that global serializability of a transaction schedule can be ensured, while the likelihood of deadlocks is substantially reduced and other problems associated with the conventional approaches are avoided.

SUMMARY OF THE INVENTION

The present invention provides global concurrency-control techniques that minimize coordination among physical sites accessing replicated data items in a distributed database system. The invention represents an improved approach to lazy update propagation that can be used to ensure global serializability while substantially reducing the likelihood of deadlocks. In accordance with the invention, each physical site of a distributed database system has a dynamically changing set of virtual sites associated with it, and a concurrency-control protocol is used to provide global transaction management over the set of virtual sites. A given virtual site may be more generally referred to herein as a set of data items associated with that virtual site. The invention involves maintaining a globally consistent replication graph or other representation of relationships between transactions to be managed and the virtual sites which include sets of data items used by the transactions. The replication graph can be used to ensure that a given schedule of transaction operations is globally serializable, such that the transactions will have concurrent access to replicated data items without the inconsistent update problems associated with the above-described conventional techniques.

The invention may be implemented in a distributed database system which includes multiple physical sites such as data warehouses, data marts and portable or desktop computers. The system stores primary copies of data items, and transactions carried out at the various physical sites in the system utilize these primary copies as well as replicated versions of the data items. The transactions include local transactions, each of which runs at one of the physical sites, and global transactions, each of which runs at multiple physical sites. Each of the transactions originates at one of the physical sites, and is permitted to read data items only at that physical site. In addition, only transactions originating at a physical site storing a primary copy of a data item are permitted to update that data item. Global concurrency control is simplified in the distributed database system by defining a number of virtual sites such that each of the local transactions runs at one virtual site, and each of the global transactions runs at one virtual site for each physical site associated therewith. A given virtual site $VS_i^j$ at a particular point in time corresponds to the set $S_i^j$ of all data items at a physical site $s_j$ that a given transaction $T_i$ has accessed from an initial operation up to that point in time. The transaction $T_i$ is said to access a data item at physical site $s_j$ if transaction $T_i$ has executed a read of the data item at site $s_j$ or has executed a write to the data item at any of the physical sites of the system.

A concurrency-control protocol is used to define the virtual sites and to maintain a representation of the relationships between the transactions and the virtual sites. The representation may be in the form of a replication graph which includes a first set of nodes corresponding to the transactions, and a second set of nodes corresponding to the virtual sites. The replication graph includes a connection between a node corresponding to a transaction $T_i$ and a node corresponding to a virtual site $VS_i^j$ if a schedule of transaction operations includes a write operation by transaction $T_i$ on a replicated data item in the set $S_i^j$ of data items associated with virtual site $VS_i^j$. The concurrency-control protocol utilizes the replication graph to determine whether the schedule of transaction operations is globally serializable. For example, the absence of cycles in the replication graph may be used to indicate that the transaction operation schedule is globally serializable.

An exemplary concurrency-control protocol in accordance with the invention receives operations submitted for execution by the various transactions. The protocol then distinguishes between the following four different groups of operations which may be submitted by a given transaction $T_i$: (1) read or write operations submitted at the physical site at which $T_i$ originated; (2) a write operation submitted at a site other than the $T_i$ origination site; (3) a commit operation; and (4) an abort operation submitted at the $T_i$ origination site. If an operation submitted by transaction $T_i$ is a read or a write operation at the physical site at which the transaction $T_i$ originated, the protocol makes tentative changes to the virtual sites and replication graph to ensure: (i) that each local transaction runs at one virtual site and each of the global transactions runs at one virtual site for each physical site associated therewith; (ii) that the virtual site $VS_i^j$ continues to include the set of all data items at physical site $s_j$ that transaction $T_i$ has accessed from an initial operation up to the time of the submitted operation; and (iii) that the replication graph includes any needed connections between an identifier corresponding to transaction $T_i$ and an identifier corresponding to virtual site $VS_i^j$ if a schedule of the transaction operations includes a write operation by transaction $T_i$ on a replicated data item in $VS_i^j$. If the resulting replication graph is acyclic and therefore indicative of a globally serializable schedule of transaction operations, the virtual sites and the replication graph are updated using the tentative changes, and the submitted operation is allowed to execute. If the resulting replication graph is not indicative of a serializable schedule, transaction $T_i$ is directed to submit an abort operation if: (i) $T_i$ is a local transaction; or (ii) $T_i$ is a global transaction and any transaction in a cycle of the replication graph is in the committed state. If $T_i$ is a global transaction and no transaction in a cycle of the replication graph is in the committed state, $T_i$ is directed to a waiting queue.

If the submitted operation is a write operation at a physical site other than the physical site at which the transaction $T_i$ originated, the protocol allows the submitted operation to execute. If the submitted operation is a commit operation, the protocol allows the submitted operation to execute and then determines whether the commit operation places the transaction $T_i$ in the completed state. If the transaction $T_i$ is in a completed state, the protocol removes any identifier of the transaction $T_i$ from the replication graph, and removes from the set of data items associated with virtual site $VS_i^j$ any data items accessed only by transaction $T_i$. In addition, the virtual sites may be split or otherwise reconfigured to take into account the completed transaction. Keeping the virtual sites small by splitting them when possible reduces the likelihood of cycles in the replication graph. A waiting queue of transactions is then checked to determine whether any waiting transaction can be activated or aborted as a result of these adjustments to the replication graph and virtual site $VS_i^j$. If the submitted operation is an abort operation at the physical site at which transaction $T_i$ originated, the protocol removes any connections to an identifier of the transaction $T_i$ from the replication graph, and removes from the set of data items associated with virtual site $VS_i^j$ any data items accessed only by transaction $T_i$. The waiting queue is then checked to determine whether any waiting transaction can be activated or aborted as a result of the adjustments to the replication graph and the virtual site $VS_i^j$. The protocol processes each submitted transaction operation in this manner, thereby providing a globally serializable transaction schedule.

In other embodiments of the invention, the protocol may be adjusted to provide a more "optimistic" approach to replication graph maintenance in which efficiency is improved by introducing a small risk of compensation or reconciliation. Furthermore, the invention may be implemented in a multiversion technique in which read operations are not delayed and multiversion serializability is ensured. The invention is also able to accommodate site failures by utilizing local database management systems. Certain types of common network partitions, such as those which arise from the disconnection of a portable computer, are very easily managed. These and other features and advantages of the present invention will become more apparent from the accompanying drawings and the following detailed description.

DETAILED DESCRIPTION OF THE INVENTION

The present invention will be illustrated below in conjunction with exemplary distributed database configurations. It should be understood, however, that the invention is not limited to use with any particular type of database or database configuration, but is instead more generally applicable to any database application in which it is desirable to provide consistency and concurrency across multiple replicated versions of data items. The term "data item" as used herein refers to a stored data element, a set of stored data elements, a record or any other type of data stored in a database or other storage system. The term "physical site" is intended to include remote customer sites, central databases, portable computers or other mobile computing devices, as well as any other physical location at which a data item may be processed. A "virtual site" refers generally to a set of data items accessed by a particular transaction at a particular physical site. A given virtual site $VS_i^j$ includes a set of data items $S_i^j$ which are accessed by a transaction $T_i$ at a physical site $s_j$. The term "transaction" as used herein refers to any set of data processing operations which involves reading, writing or otherwise utilizing a data item or items. The term "committed" refers to the state of a transaction which has executed all of its operations which were to be performed at its origination site. The term "replication graph" refers to an exemplary representation of relationships between transactions and virtual sites, and includes a first set of identifiers for at least a subset of the transactions and a second set of identifiers for at least a subset of the virtual sites. The term "distributed database system" should be understood to refer to any type of system in which data items are stored or processed in multiple physical sites, with at least one of the physical sites processing a replicated data item. As noted above, a schedule of transaction operations is "serializable" if running the transactions concurrently in accordance with the schedule yields the same results as running the transactions in some sequential order. Global serializability refers to serializability as applied to execution of all transactions in a system regardless of the physical sites at which particular transactions operate.

Figure 1:
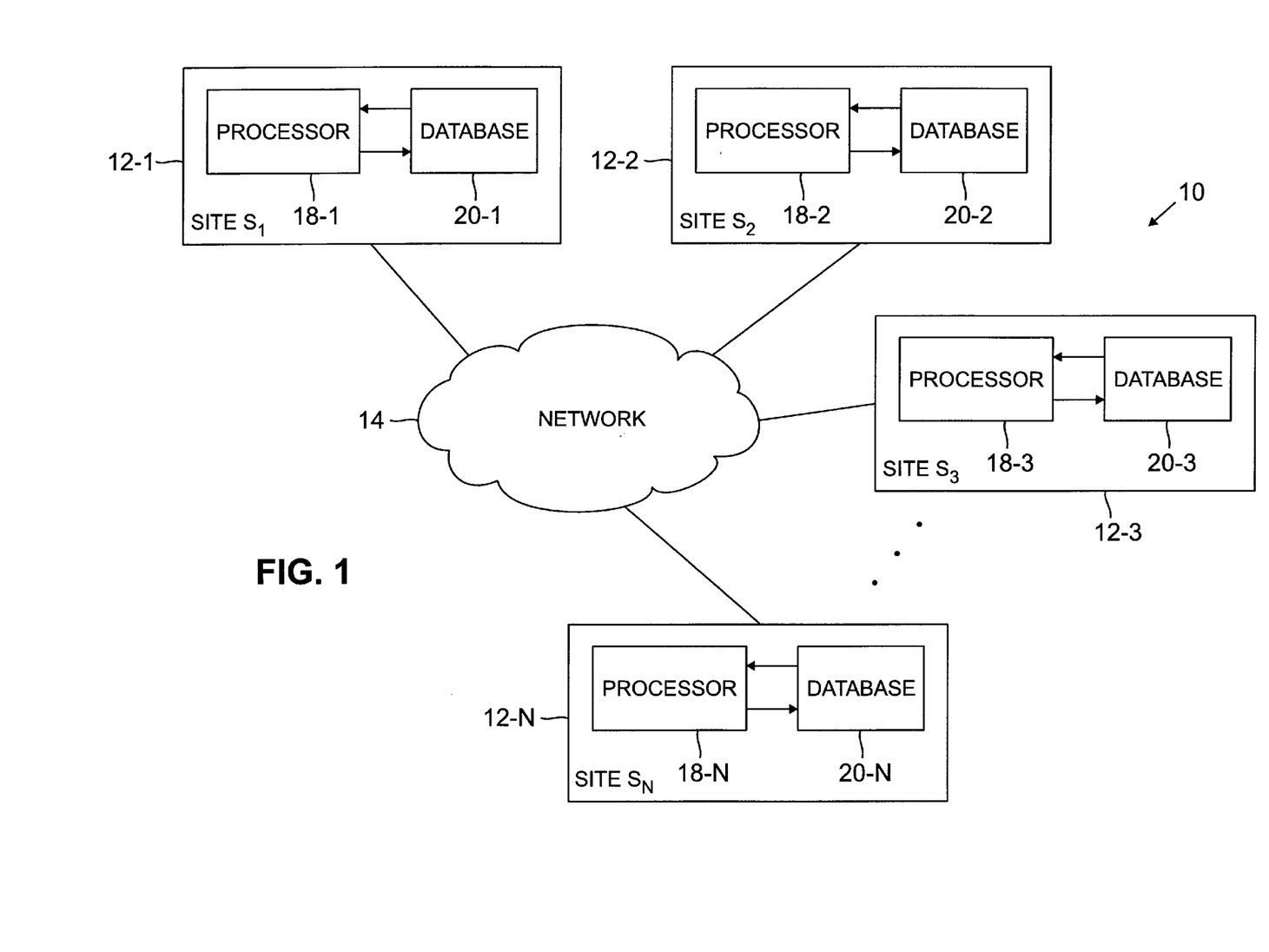
FIG. 1 shows an exemplary distributed database system in which the concurrency-control techniques of the present invention may be implemented.

FIG. 1 shows an exemplary distributed database system 10 in which the present invention may be implemented. The system 10 includes N physical sites 12-$i$, $i$=1, 2, . . . N connected by a network 14. The network 14 may be a local area network, a metropolitan area network, a wide area network, a global data communications network such as the Internet, a private "intranet" network or any other suitable data communication medium. The physical sites 12-$i$ may be centralized database systems such as data warehouses or data marts, remote customer sites such as automatic teller machines or desktop personal computers, portable computers or other mobile computing devices, or any other type of data processors. The operation of mobile computing devices in a distributed database system is described in greater detail in H. F. Korth and T. I. Imielinski, "Introduction to Mobile Computing," in Mobile Computing, pp. 1–39, Kluwer Academic Publishers, 1996, which is incorporated by reference herein. Certain of the interconnections between the various elements of the system 10 may be via relatively low-speed telephone line modem connections, such that network bandwidth is a scarce resource and the round-trip time for a message and acknowledgment is relatively large. Each of the N physical sites 12-$i$ includes a processor 18-$i$ and a database 20-$i$. The database 20-$i$ may be, for example, a large centralized database system, or a memory of a desktop or portable personal, depending upon the nature of the corresponding physical site 12-$i$.

At least a subset of the processors 18-$i$ each run a local database management system such as that described in A. Silberschatz, H. F. Korth and S. Sudarshan, "Database System Concepts," 3rd edition, McGraw-Hill, 1997, which is incorporated by reference herein. The execution of transactions in local database management systems is further described in J. Gray and A. Reuter, "Transaction Processing: Concepts and Techniques," Morgan-Kaufmann, San Mateo, Calif., 1993, which is incorporated by reference herein. The processors $18\text{-}i$ can be implemented as personal, micro or mainframe computers, workstations, microprocessors, central processing units, applicationspecific integrated circuits (ASICs) or other digital data processors, as well as various portions or combinations thereof. The databases $20\text{-}i$ may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a database $20\text{-}i$ of a given site $12\text{-}i$ is controlled by the corresponding processor $18\text{-}i$ using the local database management system such that serializability and other desirable properties are maintained. The physical sites $12\text{-}i$ of system 10 may each run multiple transactions, such as read and write transactions, during which data items stored at other sites are accessed and processed. As noted previously, such transactions can create consistency and concurrency problems in that a replicated data item processed at one site may be updated by a transaction running at that site while another non-updated replicated version is used by a transaction running at another site.

Transactions that run at only one of the physical sites $12\text{-}i$ of system 10 are referred to herein as local transactions, while those that run at multiple physical sites are referred to as global transactions. It will be assumed without limitation for purposes of the illustrative embodiments described herein that each transaction is restricted to read data only at the site at which the transaction originates. All read-only transactions will therefore be assumed to be local transactions. This assumption is a consequence of other assumed network properties in the illustrative embodiments. In an embodiment in which a transaction needs to read data not available locally, a local replica may be created outside of the transaction execution. It will also be assumed that each data item has a primary copy located at a particular site, referred to herein as its primary site, and that only transactions originating at the primary site of a data item may update that data item. Although this assumption limits the sets of data items that may be updated within a single transaction, a wide variety of practical database system applications, including applications in which each data item has a specific "owner," operate within this restriction.

An update transaction that updates only non-replicated data items is a local transaction, in accordance with the above-noted assumptions regarding reading and updating. Similarly, an update transaction that updates at least one replicated data item is a global transaction. A global update transaction may be represented by several local subtransactions: one for the transaction itself running at its origination site, and one for each physical site that holds replicas of one or more data items updated by the transaction. In an exemplary embodiment of the invention, the sub-transactions running at remote sites on behalf of a global update transaction do not begin until after the corresponding sub-transaction at the origination site has committed. For simplicity of notation, these sub-transactions will be collectively referred to herein by a common transaction designator $T_i$. In accordance with the invention, once a transaction $T_i$ has committed at its origination site, it commits independently at the other physical sites at which it runs.

In accordance with the invention, each physical site $12\text{-}i$ of the distributed database system 10 has a dynamically changing set of virtual sites associated with it, and a replication management protocol is used to provide global transaction management over the set of virtual sites. Local transaction management within a given virtual site is provided by the database management system running at the physical site $12\text{-}i$ containing the given virtual site. The replication management protocol of the present invention is part of an integrated system and can therefore utilize the transaction management information from the local transaction management systems. This is an advantage of the present invention over conventional multidatabase systems such as those described in Y. Breitbart, H. Garcia-Molina and A. Silberschatz, "Overview of Multidatabase Transaction Management," VLDB Journal, 1(2), 1992, which is incorporated by reference herein.

A given transaction $T_i$ may be in one of a number of distinct global states at any particular time. It will be assumed for the following description that $T_i$ may be in one of four global states at a given point in time: (1) aborted, if $T_i$ has aborted at its origination site; (2) active, if $T_i$ is active at its origination site; (3) committed, if $T_i$ is committed at its origination site, but not yet in the completed state; and (4) completed, if at each site at which $T_i$ executed, $T_i$ has committed and is not preceded, directly or indirectly, by an active transaction in the local serialization order of the site. In practice, there is typically a delay between the time at which a state transition occurs and the time remote sites are informed of the transition. While substantial delays of this type could harm performance in certain applications, the replication management protocol of the present invention is generally robust to arbitrary delays in the communication of state transitions. The replication management protocol to be described below also ensures that committed transactions eventually become completed. However, these states are distinguished in the protocol because even after $T_i$ has committed at every site at which it executed, it may be preceded by an active transaction. This can create a subsequent conflict that did not exist at the time $T_i$ committed at every site at which it executed. The potential conflict will be illustrated in conjunction with FIGS. 2A and 2B below.

Figure 2A:
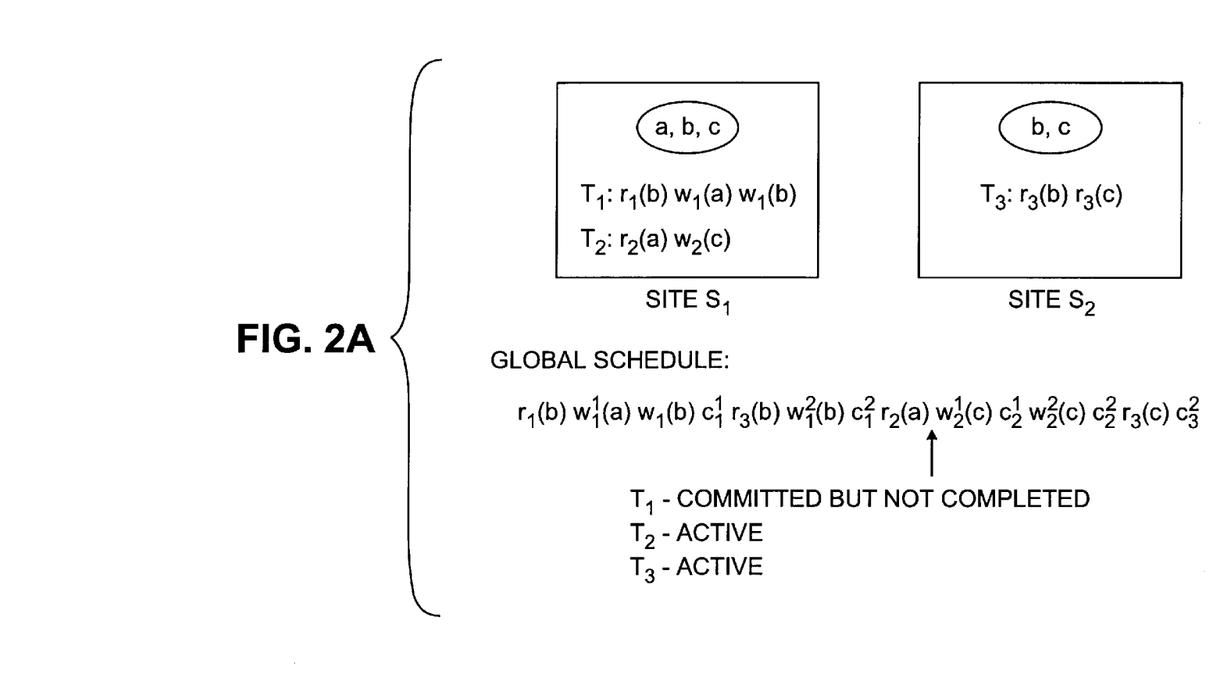
FIG. 2A illustrates an exemplary set of transactions operating on replicated data items at two physical sites in the distributed database system of FIG. 1, and a corresponding global schedule for processing the data items.

FIG. 2A illustrates a pair of physical sites $s_1$ and $s_2$ of a distributed database system such as system 10 of FIG. 1. The physical site $s_1$ contains primary copies of data items a, b and c, while the physical site $s_2$ contains replicated copies of data items b and c. Three transactions $T_1$, $T_2$ and $T_3$ are operating at the physical sites $s_1$ and $s_2$, as shown in FIG. 2A. Transactions $T_1$ and $T_2$ originate at site $s_1$, while transaction $T_3$ originates at site $s_2$. The notation $r_i(d)$ denotes an operation in which the transaction $T_i$ reads data item d. Similarly, $w_i^j(d)$ denotes an operation in which transaction $T_i$ writes to data item d at physical site $s_j$. Transaction $T_1$ includes the sequence of operations $r_1(b)\ w_1(a)\ w_1(b)$, indicating that $T_1$ involves reading data item b, writing to data item a and then writing to data item b. Transaction $T_2$ includes the sequence of operations $r_2(a)\ w_2(c)$, indicating that $T_2$ involves reading data item a and then writing to data item c. Transaction $T_3$ includes the sequence of operations $r_3(b)r_3(c)$, indicating that $T_3$ involves reading data item b and then reading data item c. The global execution order of the various operations of transactions $T_1$, $T_2$ and $T_3$ is shown in FIG. 2A and is given by:

$r_1(b)\ w_1^1(a)\ w_1^1(b)\ c_1^1\ r_3(b)\ w_1^2(b)\ c_1^2\ r_2(a)\ w_2^1(c)\ c_2^1\ w_2^2(c)\ c_2^2\ r_3(c)\ c_3^2$ where $c_i^j$ designates a commitment by a transaction $T_i$ at a site $s_j$. The following local operation schedules are then generated at the physical sites $s_1$ and $s_2$:

$s_1: r_1(b) \ w_1^1(a) \ w_1^1(b) \ c_1^1 \ r_2(a) \ w_2^1(c) \ c_2^1$ $s_2: r_3(b) \ w_1^2(b) \ w_1^2(b) \ c_1^2 \ w_2^2(c) \ c_2^2 \ r_3(c) \ c_3^2$

It is readily apparent that the above schedule is not globally serializable. For example, $T_1$ precedes $T_2$ at site $s_1$, while at site $s_2$, $T_2$ precedes $T_3$ which precedes $T_1$. At the point where $T_1$ has committed at every site at which it executes, as indicated by the arrow in the global schedule of FIG. 2A, $T_3$ is still active. In accordance with the state definitions given above, $T_1$ is not in the completed state, although it is committed everywhere. If a global concurrency-control protocol chose to no longer track $T_1$ at this point, it would generally not be possible to detect the non-serializability of the execution. The protocol of the present invention therefore retains transactions like $T_1$ until the transactions enter the above-described completed state. Once a transaction is in the completed state, it is generally safe to remove it from consideration by the protocol.

The virtual-site management aspects of the invention will now be described in greater detail. Each transaction has a virtual site associated with it at each physical site at which it executes from the time the transaction begins until the concurrency-control protocol explicitly removes it from consideration. The virtual site for a transaction $T_i$ at a physical site $s_j$ is denoted herein as $VS_i^j$. The virtual site $VS_i^j$ includes a set of data items $S_i^j$ which are accessed by transaction $T_i$ at physical site $s_j$. The set of virtual sites is constructed and maintained based on three rules$_1$ referred to as the locality rule, the union rule and the split rule. The locality rule specifies that each local transaction executes at precisely one virtual site. Read-only transactions will therefore have only one virtual site. Similarly, update transactions that do not update replicated data items have only one virtual site. A global update transaction, however, will have several virtual sites, one at each physical site at which it executes a local transaction. The union rule specifies that at every point in time, $VS_i^j$ must contain the set of data items at physical site $s_j$ that transaction $T_i$ has accessed up to that point. A transaction is said to access a data item d at site s if it has executed a read of d at s or has executed a write of any replica of d regardless of site. If an access to a data item d by $T_i$ causes a conflict with $T_k$ at physical site $s_j$, then the virtual sites of $T_i$ and $T_i$ at site $s_j$ must be the same, that is, $VS_i^j=VS_k^j$, and must contain all data items at $s_j$ accessed so far by $T_i$ or by $T_k$. A standard description of conflict between read and write operations is given in P. A. Bernstein, V. Hadzilacos and N. Goodman, "Concurrency Control and Recovery in Database Systems," Addison-Wesley, Reading, Mass., 1987, which is incorporated by reference herein. The locality and union rules described above establish the correctness of the protocol.

The split rule described below is directed to keeping the virtual sites as small as possible in order to provide performance advantages which make the protocol useful in practical applications. Therefore, when a transaction $T_i$ enters the aborted or completed state, the protocol applies the split rule to split or shrink the virtual sites. The split rule specifies that when a physical site $s_j$ determines that $T_i$ has entered either the aborted or the completed state, any data items accessed only by $T_i$ are removed from the virtual site $VS_i^j$ and the concurrency-control protocol need no longer consider $T_i$. If there is no $T_k$ distinct from $T_i$ such that $VS_i^j=VS_k^j$, this effectively removes the virtual site $VS_i^j$. Otherwise, the virtual sites associated with physical site $s_j$ are recomputed for all transactions $T_k$ such that $VS_i^j=VS_k^j$ using the above-described locality and union rules. This computation may be optimized using transaction conflict information to reduce overhead.

The concurrency-control protocol of the present invention may associate a replication graph with a set of transactions to represent conflicts arising from updates to replicated data. A single, global replication graph may be used for an entire distributed database system. The replication graph may be considered an undirected bipartite graph $RG = <T \cup V, E>$, where T is a set of transactions and V is the set of all virtual sites for transactions in T. An edge $<VS_i^j, T_i>$ belongs to the set of replication graph edges E if and only if a global schedule S contains a write operation by $T_i$ on a replicated data item that is in $VS_i^j$. It should be noted that a replication graph for a global schedule S is not necessarily unique. In addition, it can be shown that if there is an acyclic replication graph for a given global schedule S, then the schedule S is globally serializable. The present invention therefore checks the replication graph for cycles as the concurrency-control protocol generates the a global schedule S. It is generally not necessary to maintain a replication graph for the entire schedule S. Instead, it will usually suffice to maintain a dynamic replication graph which has the property that avoiding a cycle in this graph suffices to ensure serializability.

Figure 2B:
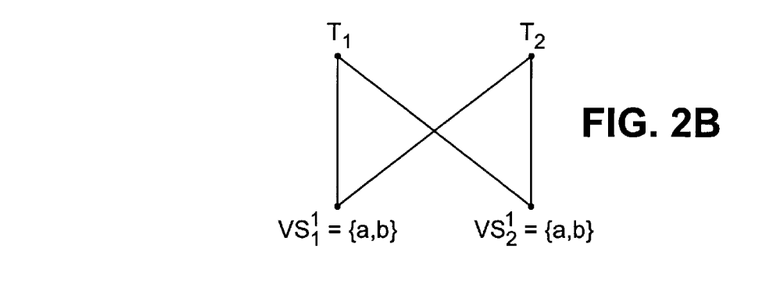
FIG. 2B shows a replication graph in accordance with the invention for a portion of the exemplary global schedule of FIG. 2A.

FIG. 2B shows an exemplary replication graph formed for a portion of the global schedule of physical sites $s_1$ and $s_2$ of FIG. 2A. The replication graph of FIG. 2B includes nodes corresponding to transactions $T_1$, $T_2$ and virtual sites $VS_1^1$ and $VS_2^1$, and four edges $<VS_1^1, T_1>$, $<VS_1^1, T_2>$, $<VS_2^1, T_1>$ and $<VS_2^1, T_2>$. The virtual site $VS_1^1$ includes the set of data items $\{a, b\}$ accessed by transaction $T_1$ at physical site $s_1$ from its initial operation to the point in the global schedule of FIG. 2A indicated by the arrow. The virtual site $VS_2^1$ includes the set of data items $\{a\}$ accessed by transaction $T_2$ at physical site $s_1$ from its initial operation to the point in the global schedule indicated by the arrow. It can be seen that the exemplary replication graph is not acyclic, that is, it includes at least one cycle or closed path. As noted previously, the schedule of FIG. 2A is not globally serializable, and therefore it will generally not be possible to construct an acyclic replication graph representing this schedule. It will be shown below that the concurrency-control protocol of the present invention may be used to generate a global schedule which may be verified as globally serializable by construction and analysis of a replication graph. From the above description of a replication graph, it follows that only global update transactions need be present among the transaction nodes of the graph, since no edges could be incident upon other transaction nodes. Furthermore, it can be shown that it suffices to maintain the replication graph only over transactions that are in the active or committed states. In other words, a transaction may be ignored once it makes a transition to either the aborted state or the completed state. Keeping the virtual sites small by splitting them when possible reduces the likelihood of cycles in the replication graph.

An exemplary concurrency-control protocol in accordance with the invention will now be described in detail. The exemplary protocol is referred to as a global serializability (GS) protocol, and uses the above-described virtual site and replication graph techniques to generate a global schedule. The GS protocol generates and maintains a replication graph for at least a portion of a schedule of transactions using replicated data items at multiple sites. The GS protocol applies a test, referred to herein as RGTEST, to the replication graph when a transaction $T_i$ submits an operation for execution.

Figure 3:
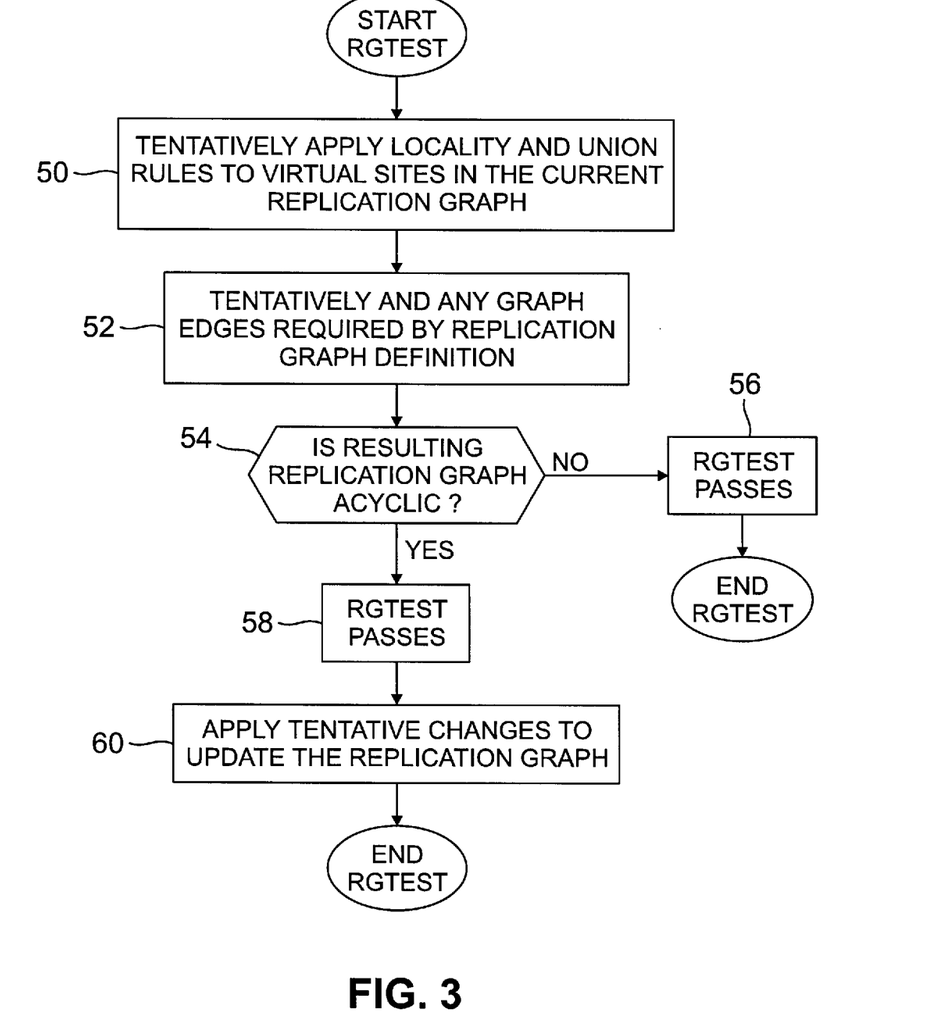
FIG. 3 is a flow diagram illustrating an exemplary replication graph test process suitable for use in for use in the database system of FIG. 1 in accordance with the invention.

FIG. 3 is a flow diagram illustrating an exemplary implementation of the RGTEST process. The test process is started when a transaction $T_i$ submits an operation for execution. In step 50, the above-described locality and union rules are tentatively applied to the virtual sites in the current version of the replication graph. In step 52, any edges required by the above-described definition of the replication graph are tentatively added to the modified graph resulting from step 50. Step 54 indicates that the resulting replication graph is tested to determine if it is acyclic. If the resulting replication graph is not acyclic, the RGTEST fails as shown in step 56. The RGTEST process is then terminated without applying the tentative changes of steps 50 and 52 to the replication graph. If the replication graph as modified in steps 50 and 52 is acyclic, the RGTEST passes as shown in step 58. The tentative changes of steps 50 and 52 are then used to update the replication graph, resulting in the generation of a new acyclic replication graph.

Figure 4A:
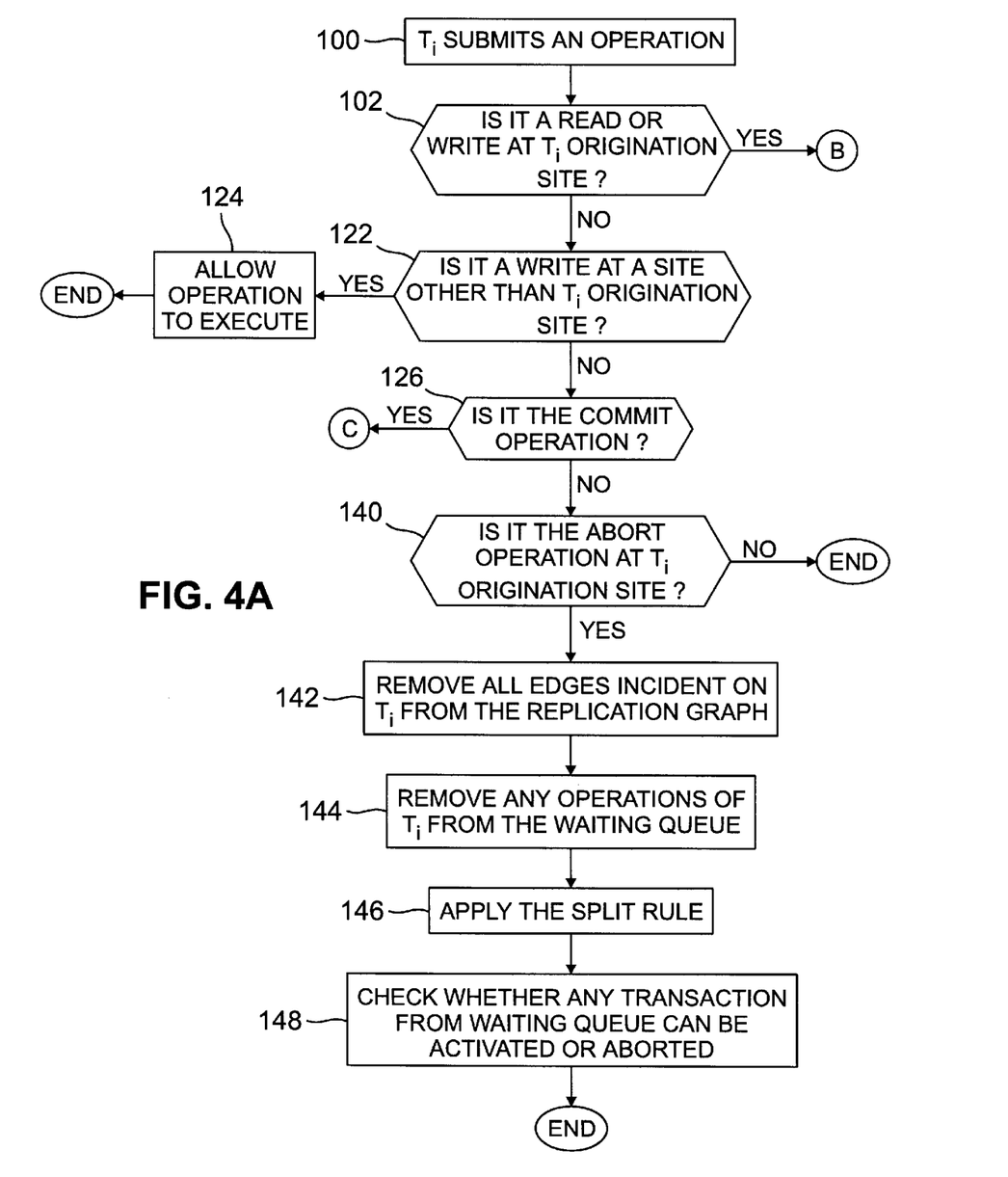
FIGS. 4A, 4B and 4C are different portions of a flow diagram illustrating an exemplary concurrency-control process for use in the distributed database system of FIG. 1 in accordance with the invention.
Figure 4B:
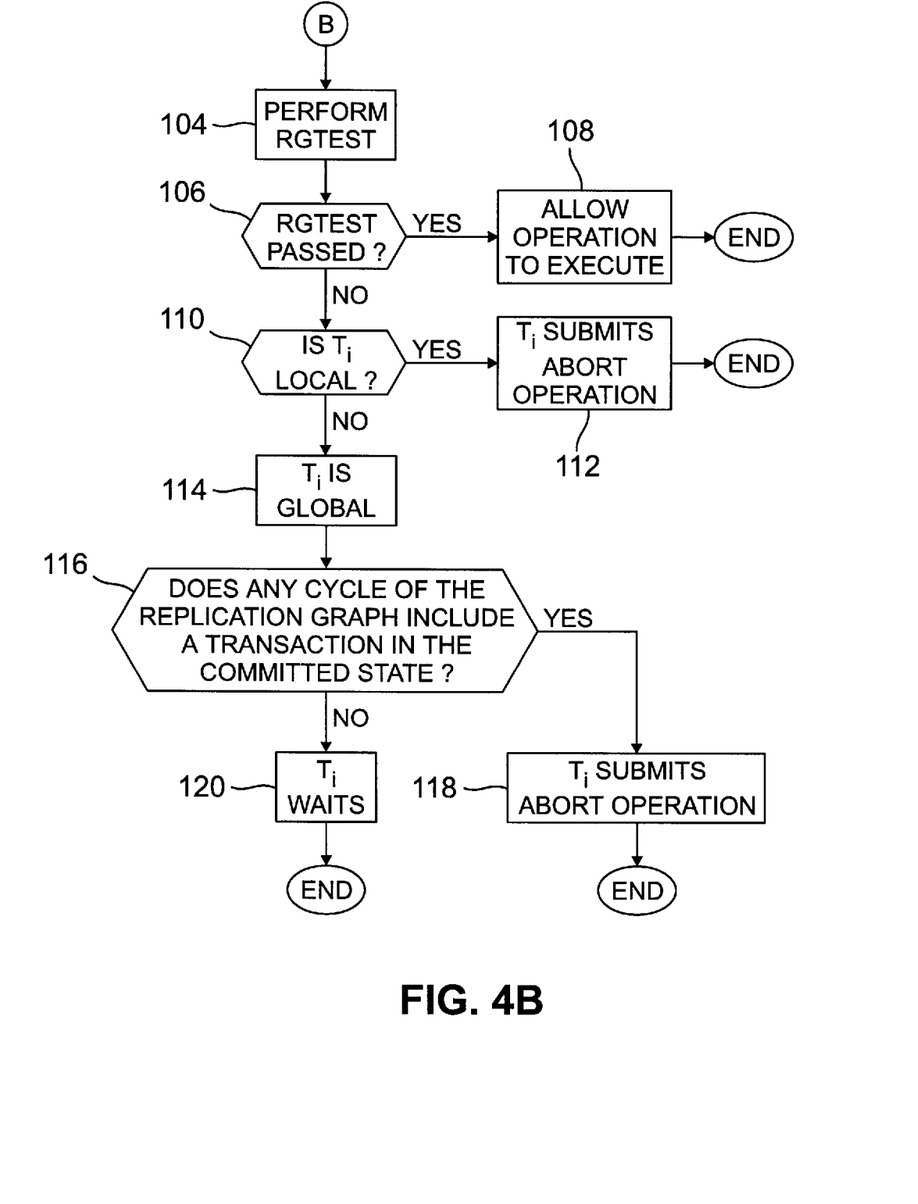
Figure 4C:
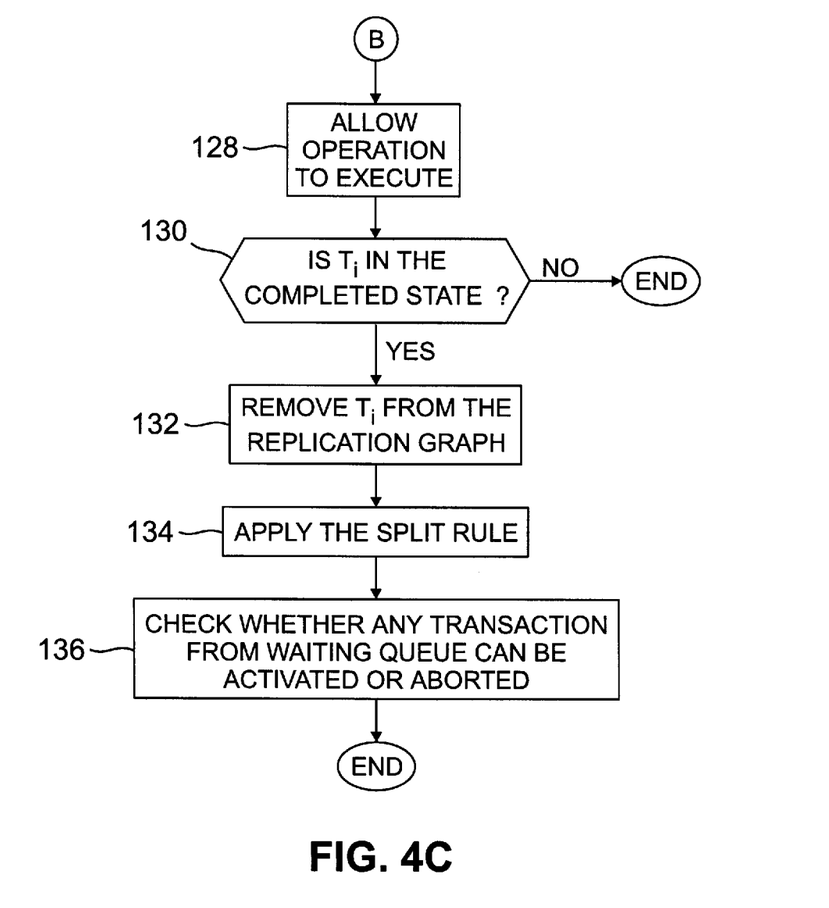

FIGS. 4A, 4B and 4C show different portions of a flow diagram illustrating the operation of an exemplary concurrency-control GS protocol in accordance with the invention. Although illustrated as applied to a single transaction, the protocol will generally be used to process multiple transactions in parallel. In step 100 of FIG. 4A, a transaction $T_i$ at a particular physical site $s_j$ submits an operation. The operation may be submitted to a processor such as a processor 18-j associated with physical site $s_j$ in the distributed database system 10, or may be generated in accordance with a software program executed by the processor 18-j. In step 102, a decision is made as to whether the operation submitted by transaction $T_i$ is a read or write operation at the origination site of $T_i$. If it is, step 104 of FIG. 4B indicates that the RGTEST process of FIG. 3 is then performed to test the replication graph. If the RGTEST is passed, the protocol allows the operation submitted by transaction $T_i$ to execute, as shown in steps 106 and 108 of FIG. 4B. If the RGTEST is not passed, steps 110 and 114 determine whether $T_i$ is a local transaction or a global transaction. If $T_i$ is a local transaction, step 112 indicates that $T_i$ then submits the abort operation. If $T_i$ is a global transaction, step 116 determines whether any cycle of the replication graph includes a transaction in the committed state. If there is a cycle in the replication graph with a transaction in the committed state, $T_i$ submits the abort operation, as shown in step 118. If no cycle of the replication graph includes a transaction in the committed state, $T_i$ waits as shown in step 120. After steps 118 and 120, the protocol ends for transaction $T_i$. The transaction $T_i$ generally waits in step 120 until another transaction either aborts or enters the completed state.

If the operation submitted by $T_i$ in step 100 is not a read or write operation at the $T_i$ origination site, step 122 of FIG. 4A determines whether the operation is a write operation at a site other than the $T_i$ origination site. If so, the protocol allows the operation to execute, as shown in step 124. If not, step 126 determines whether the operation submitted by $T_i$ is the commit operation. If it is the commit operation, the process moves to step 128 of FIG. 4C. Step 128 indicates that the protocol allows the commit operation to execute. Step 130 then determines whether $T_i$ is in the completed state. If $T_i$ is in the completed state, it is removed from the replication graph in step 132. The above-described split rule is then applied in step 134 in order to reduce the size of the virtual sites. A check is then made in step 136 as to whether any transaction from a waiting queue of transactions can be activated or aborted as a result of the operations of steps 132 and 134. The protocol then ends for transaction $T_i$.

If the operation submitted by $T_i$ in step 100 is not a read or write operation at the $T_i$ origination site, a write operation at a site other than the $T_i$ origination site, or the commit operation, step 140 of FIG. 4A determines whether the operation is an abort operation. If it is, all edges incident on $T_i$ are removed from the replication graph in step 142, and any operations of $T_i$ in the waiting queue are removed in step 144. In step 146, the split rule is applied to the resulting replication graph in order to reduce the size of the virtual sites. A check is then made in step 148 as to whether any transaction from the waiting queue can be activated or aborted as a result of the operations of steps 142 and 144. The protocol then ends for transaction $T_i$. The GS protocol of FIGS. 4A, 4B and 4C prevents a serializability problem such as that which occurred in the savings and checking account example described above by causing a loop in the replication graph at the point in the global schedule that the second transaction $T_2$ is attempted.

The above-described GS protocol guarantees global serializability. In accordance with the protocol, transaction $T_i$ cannot be removed from the replication graph until it enters the completed state, even if it has committed at all sites. While local transactions do not appear as nodes in the replication graph, these transactions do play a role in determining whether a global transaction can be removed from the graph. In general, for any k >0, a global transaction may need to remain in the replication graph until k local transactions have completed. Inability to remove a transaction from the replication graph upon its commit at all sites increases the number of transactions in the replication graph and consequently may increase the probability of a deadlock.

The handling of deadlocks in the concurrency-control protocol of the present invention will now be described in more detail. A set D of transactions is said to be in deadlock if every transaction in D has submitted an operation that either: (1) waits for another member of D within the concurrency control of a local database management system; or (2) waits in accordance with the above GS protocol due to the RGTEST process generating a replication graph cycle involving only the transactions in D and their associated virtual sites. Deadlocks that arise solely within a local site may be managed directly by the local database management system associated with that site. Global deadlocks under the protocol of FIGS. 4A, 4B and 4C generally occur only in certain restricted forms as will be shown below. It is believed that any global deadlock caused by the GS protocol of FIGS. 4A, 4B and 4C will involve at least three distinct global transactions. Because read transactions that cause a loop or cycle in the replication graph are aborted and later restarted in accordance with the GS protocol, only global transactions are involved in any global deadlock cycles that occur.

Figure 5A:
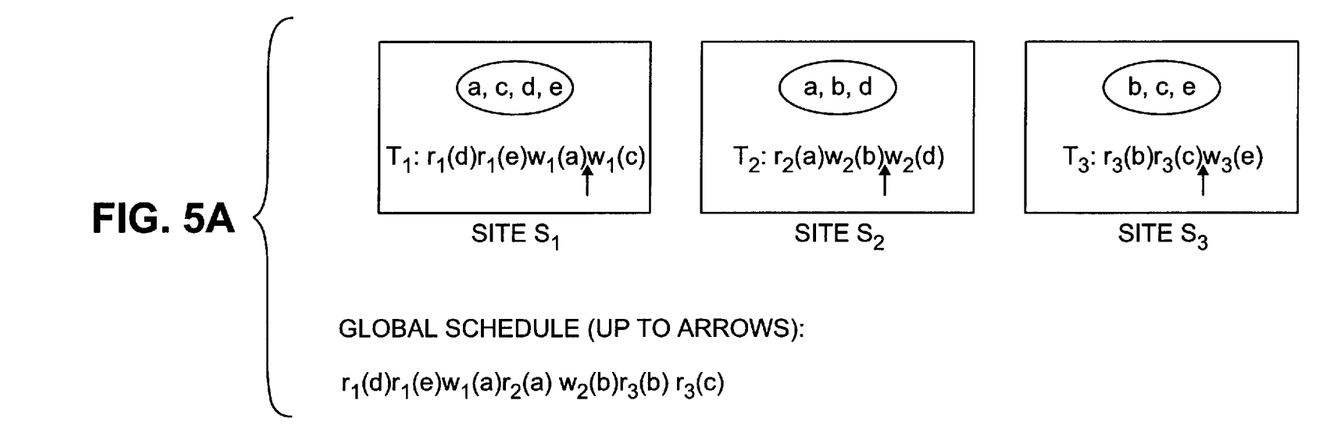
FIG. 5A shows an exemplary set of transactions operating on replicated data items at three sites in the distributed database system of FIG. 1, and a corresponding global schedule for processing the data items, illustrating the processing of deadlocks in accordance with the invention.

FIG. 5A illustrates a deadlock arising in a distributed database system having three physical sites $s_1$, $s_2$ and $S_3$. The site $s_1$ contains primary copies of data items a and c, and replicated copies of data items d and e. Site $s_2$ contains primary copies of data items b and d, and a replicated copy of data item a. Site $s_3$ contains a primary copy of data item e and replicated copies of data items b and c. Three transactions $T_1$, $T_2$ and $T_3$ are operating at the sites $s_1$, $s_2$ and $s_3$, as shown in FIG. 5A. The transactions $T_1$, $T_2$ and $T_3$ originate at sites $s_1$, $s_2$ and $s_3$, respectively. Transaction $T_1$ includes the sequence of operations $r_1(d)$ $r_1(e)$ $w_1(a)$ $w_1(c)$, indicating that $T_1$ involves reading data items d and e, writing to data item a and then writing to data item c. Transaction $T_2$ includes the sequence of operations $r_2(a)$ $w_2(b)$ $w_2(d)$, indicating that $T_2$ involves reading data item a and then writing to data items c and d. Transaction $T_3$ includes the sequence of operations $r_3(b)$ $r_3(c)$ $w_3(e)$, indicating that $T_3$ involves reading data items b and c and then writing to data item e. The global execution order of the operations of transactions $T_1$, $T_2$ and $T_3$ up to the point in time indicated by the arrows in FIG. 5A is given by:

$r_1(d)$ $r_1(e)$ $w_1(a)$ $r_2(a)$ $w_2(b)$ $r_3(b)$ $r_3(c)$.

It can be seen that a deadlock arises in the exemplary schedule of FIG. 5A, at the point in the transaction operation execution corresponding to the arrows.

Figure 5B:
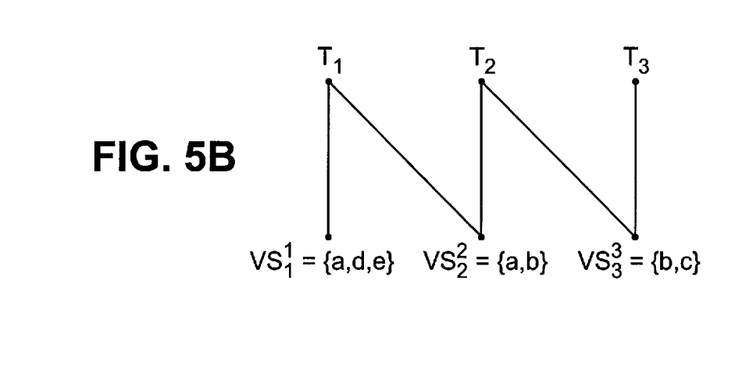
FIG. 5B shows a replication graph in accordance with the invention for the exemplary global schedule of FIG. 5A.

FIG. 5B shows the corresponding replication graph formed for the global schedule of sites $s_1$, $s_2$ and $s_3$ of FIG. 5A, at the point in transaction operation execution corresponding to the arrows in FIG. 5A. The replication graph of FIG. 5B includes nodes corresponding to transactions $T_1$, $T_2$ and $T_3$ and virtual sites $VS_1^1$, $VS_2^2$ and $VS_3^3$, and five edges $<VS_1^1, T_1>$, $<VS_2^2, T_1>$, $<VS_2^2, T_2>$, $<VS_3^3, T_2>$ and $<VS_3^3, T_3>$. The virtual sites $VS_1^1$, $VS_2^2$ and $VS_3^3$ include the respective sets of data items {a,b,e}, {a,b} and {b,c} accessed by transaction $T_1$ at physical site $s_1$, transaction $T_2$ at physical site $s_2$ and transaction $T_3$ at physical site $s_3$, respectively, from their initial operations to the points in FIG. 5A indicated by the arrows. The virtual site $VS_2^2$ in this example is also equivalent to virtual site $VS_1^2$, while the virtual site $VS_3^3$ is also equivalent to virtual site $VS_2^3$. It can be seen that the exemplary replication graph at this point is acyclic, that is, it does not include any cycle or closed path. The schedule of FIG. 5A is therefore globally serializable. As noted above, the concurrency-control protocol of the present invention may be used to generate a global schedule which may be verified as globally serializable by construction and analysis of a replication graph. However, a deadlock arises in the schedule of FIG. 5A after the point corresponding to the arrows. When $T_1$ submits $w_1(c)$ at site $s_1$, the GS protocol will make $T_1$ wait, since otherwise the cycle $T_1$–$VS_3^3$–$T_2$–$VS_2^2$–$T_1$ would occur in the replication graph. When $T_2$ submits $w_2(d)$ at site $s_2$, the GS protocol will also make $T_2$ wait, since otherwise the cycle $T_1$–$VS_1^1$–$T_2$–$VS_2^2$–$T_1$ would occur in the replication graph. Finally, when $T_3$ submits $w_3(e)$ at site $s_3$, the GS protocol will also make $T_3$ wait, since otherwise the cycle $T_1$–$VS_1^1$–$T_3$–$VS_3^3$–$T_2$–$VS_2^2$–$T_1$ would occur in the replication graph. Consequently, none of the transactions can proceed, and a deadlock occurs.

Deadlocks such as this that involve waits generated by the GS protocol may be handled by, for example, implementing a timeout-based technique to abort transactions that have been waiting for an extended period of time and are therefore likely to be in deadlock. Such an approach provides acceptable deadlock management in applications in which global deadlocks are substantially less likely than deadlocks within a local database management system. In the above-described GS protocol, the probability PD of additional deadlocks such as that illustrated in conjunction with FIGS. 5A and 5B, beyond those generated in the local database management systems, is on the order of $n^3(r^7/m^5)$, where n is the number of global transactions which have not yet completed, r is the number of data items accessed by each of the n transactions, and m is the average local database size in number of data items. The estimate further assumes that all of the m data items are fully replicated at each of the physical sites, that each transaction is half-executed and thus has accessed r/2 data items, that the data accesses are uniformly distributed, and that all of the accesses are writes. The probability that a given transaction deadlocks is on the order of PD/n. Assuming that m is large and nr<<m, the probability of deadlocks in the GS protocol is substantially smaller than that of deadlocks within the local database management systems. Although deadlocks within the local database management systems can also arise, such local deadlocks are not caused by waits generated by the GS protocol of the present invention, and can be handled using conventional methods implemented within the local database management systems.

The above-described replication graph may be maintained using centralized or distributed techniques. For example, in an embodiment with centralized maintenance, the GS protocol may be implemented by a particular one of the processors 18-$i$ of the distributed system of FIG. 1, while in an embodiment with distributed maintenance, the GS protocol may be implemented by all or a subset of the processors 18-$i$ of FIG. 1. It can be shown that centralized graph maintenance generally requires fewer transmitted messages than a conventional global locking technique since only global writes generate new graph edges, and updates to $VS_i^j$ can be generated only by site $s_j$ so a site need perform graph maintenance globally only if it determines locally that virtual sites must be merged. Moreover, the above-described split rule can be applied lazily to conserve network resources. It should be noted that centralized graph maintenance may present problems of performance and recoverability. In order to enhance performance, an "optimistic" approach may be used in which updates to the replication graphs are distributed to the physical sites on a best-effort basis. A validation test may then be run prior to transaction commit, and the transaction aborted if it is determined to be in a cycle of the replication graph. The protocol may also be implemented in a multiversion serializability embodiment which ensures that read-only transactions are never delayed. A multiversion serializability embodiment may utilize a modified version of the GS protocol described in conjunction with FIGS. 4A, 4B and 4C above in which all read-only transactions are eliminated from consideration, and are automatically allowed to proceed. All other transactions are processed in the manner described in conjunction with the GS protocol. If the replication graph associated with such an embodiment is acyclic, it indicates that the corresponding global schedule is multiversion serializable.

It should be noted that the reliance on local database management systems for recovery in the above illustrative embodiment simplifies the problem of recovery at the global level. A given site need only maintain an accurate view of the replication graph as it pertains to the virtual sites associated therewith and to transactions originating at the site in order to enable recovery. For example, assume that a physical site $s_1$ crashes. Upon recovery, any transaction that was active at site $s_1$ but did not originate at $s_1$ must be completed by accessing the primary copy of the data the failed transaction was updating. With the protocol of the present invention, recovery is simple for arbitrary site failures and for singleton partitions. Blocking or reconciliation techniques may only be needed in the case of general partitions, which are highly unlikely in many typical distributed database system applications.

The above-described embodiments of the invention are intended to be illustrative only. Numerous alternative embodiments may be devised by those skilled in the art without departing from the scope of the following claims.

What is claimed is:

1. A method of managing a plurality of transactions in a distributed database system storing a plurality of data items and including a plurality of physical sites, each of the transactions originating at one of the physical sites, the plurality of transactions including a number of global transactions each being processed at multiple physical sites, the method including the steps of:

specifying sets of data items such that a given set $S_i^j$ of data items at a particular point in time includes all data items at a physical site $s_j$ that a given transaction $T_i$ has accessed from an initial operation up to the point in time;

maintaining a representation of relationships between the transactions and the sets of data items such that the representation includes a first set of identifiers for at least a subset of the transactions, a second set of identifiers for at least a subset of the sets of data items, and a connection between an identifier corresponding to the transaction $T_i$ and an identifier corresponding to the set $S_i^j$ if a schedule of transaction operations includes a write operation by the transaction $T_i$ on a data item in the set $S_i^j$; and determining whether the schedule of transaction operations is serializable based on the representation.

2. The method of claim 1 wherein the plurality of transactions further includes a number of local transactions each being processed at one of the physical sites, and wherein the specifying step includes specifying the sets of data items such that each of the local transactions is associated with a corresponding one of the sets of data items and each of the global transactions is associated with multiple sets of data items.

3. The method of claim 1 wherein the representation of the relationships between the transactions and the sets of data items is in the form of a replication graph, the replication graph including a first set of nodes corresponding to the first set of identifiers for the transactions, a second set of nodes corresponding to the second set of identifiers for the sets of data items, and a connection between a node corresponding to the transaction $T_i$ and a node corresponding to the set $S_i^j$ if the schedule of the transaction operations includes a write operation by the transaction $T_i$ on a replicated data item in the set $S_i^j$.

4. The method of claim 1 wherein the determining step includes determining whether the schedule of transaction operations is multiversion serializable based on the representation.

5. The method of claim 3 wherein the determining step includes determining whether the replication graph is acyclic, wherein an acyclic replication graph indicates that the schedule is serializable.

6. The method of claim 1 wherein each of the transactions reads data items only at the physical site at which the transaction originates.

7. The method of claim 1 wherein only transactions originating at a physical site at which a primary copy of a data item is located are permitted to update that data item.

8. The method of claim 1 wherein if an access to a data item by a first transaction at a given physical site causes a conflict with a second transaction at the same site, the sets of data items associated with the first and second transactions at the given physical site will each include all data items accessed at the given physical site by the first and second transactions.

9. The method of claim 1 wherein the transaction $T_i$ accesses a data item at the physical site $s_j$ if the transaction $T_i$ has executed a read of the data item at the site $s_j$ or has executed a write to the data item at any of the physical sites of the system.

10. The method of claim 1 wherein the plurality of transactions are managed using a plurality of processors, each of the processors associated with one of the physical sites and participating in the steps of specifying the sets of data items and maintaining the representation of the relationship between the transactions and the sets of data items.

11. The method of claim 1 wherein the plurality of transactions are managed using a single processor having access to each of the physical sites over a network.

12. The method of claim 1 further including the steps of:

receiving an operation submitted by the transaction $T_i$;

if the submitted operation is a read or a write operation at the physical site at which the transaction $T_i$ originated, making tentative changes to the representation to ensure that the set $S_i^j$ continues to include a set of all data items at the physical site $s_j$ that the transaction $T_i$ has accessed from an initial operation up to the time of the submitted operation; and modifying the representation to add any needed connections between an identifier corresponding to the transaction $T_i$ and an identifier corresponding to the set $S_i^j$ if a schedule of the transaction operations includes a write operation by the transaction $T_i$ on a replicated data item in the set $S_i^j$.

13. The method of claim 12 further including the steps of:

updating the sets of data items and the representation and allowing the submitted operation to execute, if the representation after the modifying step is indicative of a serializable schedule of transaction operations;

if the resulting representation is not indicative of a serializable schedule, determining whether the transaction $T_i$ is a local or global transaction;

directing the transaction $T_i$ to submit an abort operation if $T_i$ is a local transaction;

if $T_i$ is a global transaction and any transaction in the representation is in a committed state, directing $T_i$ to submit an abort operation; and if $T_i$ is a global transaction and no transaction in the representation is in a committed state, directing $T_i$ to a waiting queue.

14. The method of claim 1 further including the steps of:

receiving an operation submitted by the transaction $T_i$; and if the submitted operation is a write operation at a physical site other than the physical site at which the transaction $T_i$ originated, allowing the submitted operation to execute.

15. The method of claim 1 further including the steps of:

receiving an operation submitted by the transaction $T_i$;

if the submitted operation is a commit operation, allowing the submitted operation to execute;

if the transaction $T_i$ is in a completed state, removing any identifier of the transaction $T_i$ from the representation, and removing from the set $S_i^j$ any data items accessed only by transaction $T_i$; and determining whether any waiting transaction can be activated or aborted as a result of adjustments to the representation and the set $S_i^j$.

16. The method of claim 1 further including the steps of:

receiving an operation submitted by the transaction $T_i$;

if the submitted operation is an abort operation at the physical site at which the transaction $T_i$ originated, removing any connections to an identifier of the transaction $T_i$ from the representation, and removing from the set $S_i^j$ any data items accessed only by transaction $T_i$; and determining whether any waiting transaction can be activated or aborted as a result of adjustments to the representation and the set $S_i^j$.

17. A distributed database system for storing a plurality of data items and controlling access to the data items at a plurality of physical sites configured to communicate over a network, comprising:

at least one processor for managing a plurality of transactions involving the data items, each of the transactions originating at one of the physical sites, the plurality of transactions including a number of global transactions each being processed at multiple physical sites, wherein the at least one processor is operative to specify sets of data items such that a given set $S_i^j$ of data items at a particular point in time includes all data items at a physical site $s_j$ that a given transaction $T_i$ has accessed from an initial operation up to the point in time, and is further operative to maintain a representation of relationships between the transactions and the sets of data items such that the representation includes a first set of identifiers for at least a subset of the transactions, a second set of identifiers for at least a subset of the sets of data items, and a connection between an identifier corresponding to the transaction $T_i$ and an identifier corresponding to the set $S_i^j$ if a schedule of transaction operations includes a write operation by the transaction $T_i$ on a data item in the set $S_i^j$, such that the representation may be used to determine whether the schedule of transaction operations is serializable.

18. The system of claim 17 wherein the plurality of transactions further includes a number of local transactions each being processed at one of the physical sites, and wherein the processor specifies the sets of data items such that each of the local transactions is associated with a corresponding one of the sets of data items and each of the global transactions is associated with multiple sets of data items.

19. The system of claim 17 further including a plurality of processors, each of the processors associated with one of the physical sites and participating in the operations of specifying the sets of data items and maintaining the representation of the relationship between the transactions and the sets of data items.

20. The system of claim 17 wherein the at least one processor includes a single processor with access to each of the physical sites over the network.

21. The system of claim 17 wherein the representation of the relationships between the transactions and the sets of data items is in the form of a replication graph, the replication graph including a first set of nodes corresponding to the first set of identifiers for the transactions, a second set of nodes corresponding to the second set of identifiers for the sets of data items, and a connection between a node corresponding to the transaction $T_i$ and a node corresponding to the set $S_i^j$ if the schedule of the transaction operations includes a write operation by the transaction $T_i$ on a replicated data item in the set $S_i^j$.

22. The system of claim 17 wherein the at least one processor determines whether the schedule of transaction operations is multiversion serializable based on the representation.

23. The system of claim 21 wherein the at least one processor determines whether the replication graph is acyclic, wherein an acyclic replication graph indicates that the schedule is serializable.

24. The system of claim 17 wherein each of the transactions reads data items only at the physical site at which the transaction originates.

25. The system of claim 17 wherein only transactions originating at a physical site at which a primary copy of a data item is located are permitted to update that data item.

26. The system of claim 17 wherein if an access to a data item by a first transaction at a given physical site causes a conflict with a second transaction at the same site, the sets of data items associated with the first and second transactions at the given physical site each include all data items accessed at the physical site by the first and second transactions.

27. The system of claim 17 wherein the transaction $T_i$ accesses a data item at the physical site $s_j$ if the transaction $T_i$ has executed a read of the data item at the site $s_j$ or has executed a write to the data item at any of the physical sites of the system.

* * * * *